April 28, 1970 F. VRATARIC, JR 3,509,389

PIEZO-ELECTRIC CRYSTAL CONSTRUCTION

Original Filed Sept. 14, 1966

INVENTOR

FRANK VRATARIC, JR.

BY Harry M. Saragovitz, Edward J. Kelly, Herbert Berl & J. D. Edgerton

ATTORNEYS

United States Patent Office 3,509,389
Patented Apr. 28, 1970

3,509,389
PIEZO-ELECTRIC CRYSTAL CONSTRUCTION
Frank Vrataric, Jr., Silver Spring, Md., assignor to the United States of America as represented by the Secretary of the Army
Continuation of application Ser. No. 579,807, Sept. 14, 1966. This application Mar. 5, 1969, Ser. No. 805,118
Int. Cl. H01v 7/00
U.S. Cl. 310—9.1 1 Claim

ABSTRACT OF THE DISCLOSURE

A piezo-electric crystal disposed between two holder elements and subjected to a compressive force prior to assembly. The crystal element is then assembled in such a manner that the compressive forces on the crystal are maintained.

This application is a streamline continuation of application 579,807 filed Sept. 14, 1966.

The present invention relates to an improved piezo-electric crystal construction resulting in greatly increased reliability under conditions of large acceleration forces.

Piezo-electric crystals exhibit a strong interrelationship between electrical and mechanical vibrations of the crystal structure, which results in a highly frequency sensitive electrical impedance. Such crystals have been used extensively as filters and frequency standards in a wide variety of military and civilian electronic applications.

Many types of piezo-electric crystals exhibiting a wide variety of physical and electrical properties are available. Among these, one particular class of crystals is of special interest due to advantageous ranges of resonant frequencies and also because of other advantageous properties. These crystals are of the type in which the mechanical vibration is characterized by shear rather than flexural or extensional motion. Crystals of this type include the so-called "AT" and "BT" cuts which are characterized by resonant frequencies within the range of between $10^6$ and $10^8$ Hz.

While these crystals are among the more commonly used types, difficulties have been encountered in adapting them to use in adverse environments, especially when they are to be incorporated in electronic equipment subjected to acceleration forces of large magnitude. For example, preparation of piezo-electric crystals for use as electronic circuit elements is accomplished by cutting wafer-like sections from a bulk of piezo-electric material, e.g., quartz, grinding and polishing the wafer to the appropriate dimensions, and affixing two or more electrical contacts to the crystal. One technique for providing electrical contacts involves the direct plating of a highly conductive material such as silver onto the crystal surfaces, followed by the soldering of electrical conductors to the plated silver. This is entirely satisfactory as long as the crystal is not subjected to large external forces. However, crystals prepared in this manner are quite fragile and subject to breakage under moderate forces, even when protected by encapsulation in a sheath of epoxy resin.

Many applications of piezo-electric crystals require considerably greater strength than that available with crystals produced as described above. For example, crystal oscillators and filters are often subjected to acceleration an excess of 1000 g. and must be so constructed that under these conditions, there will be no breakage of electrical contacts or damage to the crystal itself. It has been found that direct attachment of electrical contacts to the crystal itself does not produce satisfactory results.

Accordingly, other crystal mounting techniques have been developed. One technique commonly in use, provides electrical connection to the crystal by means of spring loaded contacts, disposed on opposite sides of the crystal. In such structures, the crystal and the contacts are rigidly supported in a suitable housing, and the entire structure is encapsulated in epoxy resin.

This technique has become standard in the fabrication of crystals for military use; the type CR 24/U military crystal (AT cut) is constructed in this manner. These crystals have been found satisfactory even in environments where acceleration forces of approximately 3000*g* are encountered.

However, applications for piezo-electric crystals have evolved wherein the crystal may be subjected to acceleration forces considerably in excess of 3000*g*, for example, 50,000*g* or more. It does not appear that the above described type CR 24/U crystal or any other heretofore known crystal characterized by mechanical vibration in the shear mode can be used under these conditions.

In contrast, according to the present invention, it has been discovered that dramatically improved resistance to damage from acceleration forces can be achieved by use of a crystal construction in which an appropriately prepared crystal blank is disposed between two holder elements, the entire structure being subjected to moderate compressive forces prior to assembly. It is found that if the compressive forces on the crystal are maintained, i.e., if the piezo-electric wafer remains compressed after assembly, greatly improved resistance to damage by acceleration forces is achieved. Thus, crystals prepared in accordance with this invention have been found to be resistant to mechanical damage when subjected to acceleration forces as high as 72,000*g*. Electronic oscillators incorporating these crystals have been found to survive acceleration forces of this magnitude with a permanent shift in resonant frequency of as little as one part in 60,000.

Accordingly, it is an object of this invention to provide an improved construction for piezo-electric crystals.

It is a more specific object of this invention to provide an improved piezo-electric crystal construction capable of withstanding acceleration forces greatly in excess of that previously possible.

It is a further object of this invention to provide a construction for piezo-electric crystals vibrating in a shear mode which crystals are able to withstand acceleration forces as high as 72,000 *g* or more.

It is a further object of this invention to provide a crystal construction including a piezo-electric element vibrating in a shear mode, a pair of contact and support elements disposed on opposite sides of the piezo-electric element, and suitable means for permanently assembling the above elements while maintaining the piezo-electric element under moderate compressive force.

The exact nature of this invention, as well as other objects and advantages thereof, will be understood from consideration of the following detailed description in conjunction with the appended drawings in which.

Figure 1:
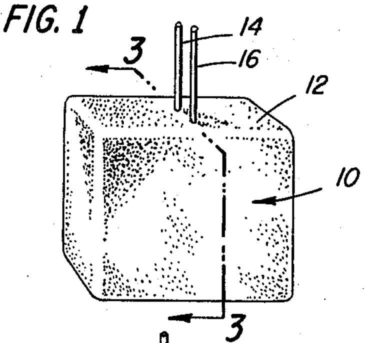
FIGURE 1 is an overall perspective view of an assembled crystal according to this invention.

With reference first to FIGURE 1, the improved crystal of the present invention generally denoted at 10, is shown in finished form. The crystal includes an outer casing 12 molded of epoxy resin and a pair of wires 14 and 16 extending through casing 12 which serve as electrical connections. The entire structure shown in FIGURE 1 is produced in a conventional manner after the inner components are assembled in accordance with this invention, by immersing the crystal in a bath of liquid epoxy resin in a suitably shaped mold, and permitting the resin to harden.

Figure 3:
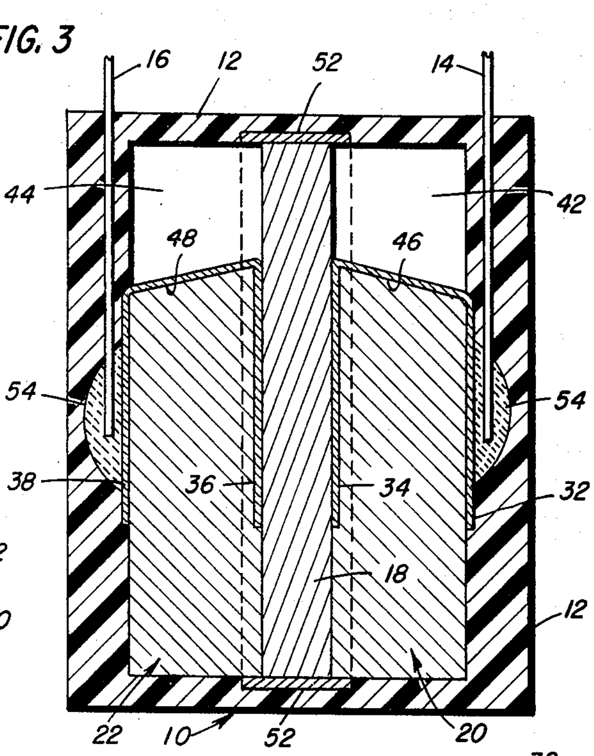
FIGURE 3 is a sectional view taken along line 3—3 in FIGURE 1 showing the internal structure of the improved crystal acc rding to this invention.
Figure 2:
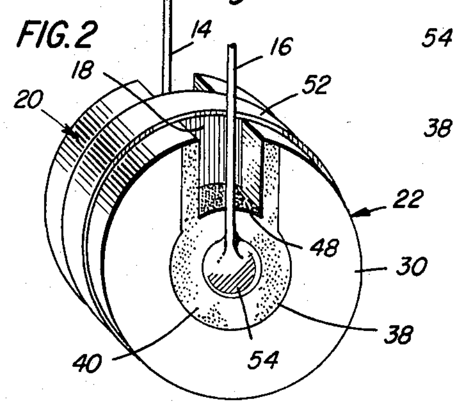
FIGURE 2 is a perspective view of the entire crystal according to this invention but prior to encapsulation in its outer protective shell.
Figure 4:
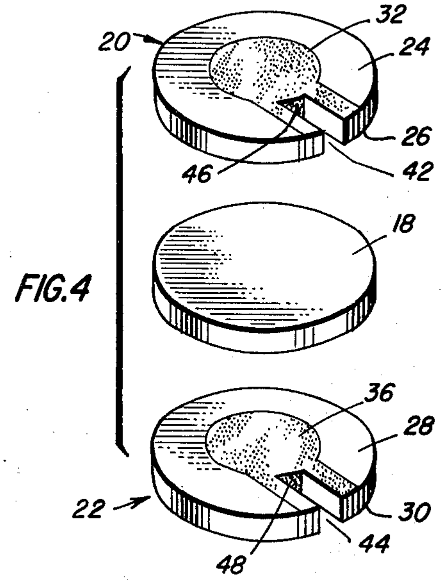
FIGURE 4 is an exploded view showing the piezo-electric element and the contact and support elements disposed on opposite sides thereof.

The actual construction of crystal 10 is best seen in FIGURES 2–4, FIGURE 2 showing, in perspective, the assembled crystal with epoxy casing 12 removed, FIGURE 3 showing a cross-section of the completed encased crystal, and FIGURE 4 showing an exploded view of the internal elements comprising the crystal.

As illustrated in FIGURES 2–4, the crystal comprises a piezo-electric element 18 positioned between a pair of contact and support members 20 and 22. Piezo-electric element 18 is formed by properly cutting, grinding and polishing a wafer of piezo-electric material, e.g., quartz, in such a manner that the permissible mechanical vibration will be in shear, rather than flexural or extensional. Techniques for accomplishing this are well known, and are not described in detail herein. Reference may be had to Quartz Crystals for Electrical Circuits, by Raymond A. Heising, published by D. VanNostrand Co., New York, 1946 for a detailed discussion of the cutting and preparation of piezo-electric elements for use in electronics.

Contact and support members 20 and 22 are formed of ceramic or other non-conducting material and are preferably in the form of disc-like wafers of approximately the same dimensions as the piezo-electric element 18 with which they are to be used. The exact dimensions of contact and support members 20 and 22 may be subject to some variation; however, satisfactory operation has been obtained with disc-like piezo-electric elements of approximately ½ inch diameter. Members 20 and 22 are preferably of approximately $\frac{1}{16}$ inch thickness, or in any event of approximately the same or somewhat greater thickness than the piezo-electric element 18 itself.

In order to utilize piezo-electric element 18 in an electrical circuit under high-*g* conditions, electrical signals must be coupled to the element itself, preferably without direct attachment. Previously encountered difficulties are overcome according to the present invention by connecting leads 14 and 16 to contact and support members 20 and 22 which are then capacitively coupled to the piezo-electric element 18 as described below.

To provide an electrical path between element 18 and leads 14 and 16 the flat surfaces 24 and 26 of contact and support member 20, and the like surfaces 28 and 30 of member 22, are partially coated with a thin, highly conductive metallic layer, such as layers 32, 34, 36, and 38, shown on surfaces 24, 26, 28, and 30, respectively. The coating may be applied in conventional fashion, e.g., by vacuum deposition of metallic silver or other highly conductive metal. As illustrated, conductive layers 32–38 each include a generally circular portion such as 40 in FIGURE 2, centrally located on the respective surfaces of the support members.

Conductive paths from surface 24 to surface 26, and from surface 28 to surface 30 are provided by a pair of generally radial slots 42 and 44, extending inwardly from the periphery of members 20 and 22 respectively. Slots 42 and 44 are preferably quite small to maximize structural integrity, but should extend inwardly at least to the periphery of central conductive layers 32–38. As shown in FIGURE 3, the radially inner surfaces 46 and 48 may be slightly sloping; however, satisfactory results are also achieved with straight-sided slots.

Radially inner surfaces 46 and 48 are covered with a layer of conductive material in order to provide substantially zero resistance between central conductive layers 32 and 34, and between layers 36 and 38. Further assurance of an adequate conductive path may be achieved by extending central conductive layers 32–38 along the edges of slots 42 and 44. Then the adjacent walls of the slots may be coated as in the case of walls 46 and 48. In this way the respective surfaces of contact and support members 20 and 22 are interconnected by a highly conductive layer of an area equal to the combined area of the walls of slots 42 and 44. The above described technique of providing a conductive path between opposite sides of members 20 and 22 is preferred, however, it should be recognized that other suitable constructions which achieve the same result are also contemplated.

As previously mentioned, members 20 and 22 serve the additional highly significant purpose of maintaining the piezo-electric element 18 under compression. The exact amount of compressive force may be subject to some variation, but it has been found that the remarkably improved resistance to acceleration damage achieved by the present invention is largely dependent upon the presence of a sufficient compressive force. Most satisfactory results are achieved if the piezo-electric element 18 and the contact and support members 20 and 22 are subjected to a minimum compression of between 2–5 p.s.i. An upper limit on the compression applied to the crystal during assembly is imposed by convenience and by the requirement that neither members 20 and 22 nor the piezo-electric element 18 be damaged. In practice, is is found that a compressive force of between approximately 10 and 50 p.s.i. is most satisfactory.

Figure 5:
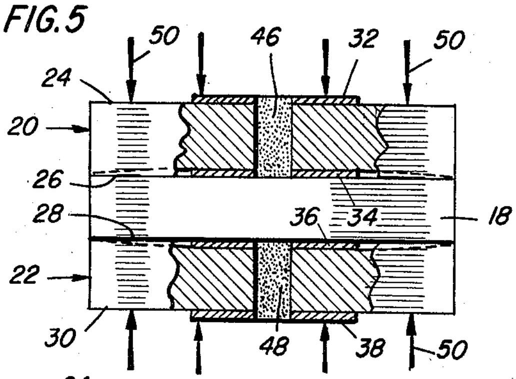
FIGURE 5 is a side elevation with certain dimensions greatly distorted to show one advantageous feature of the invention and the manner in which the elements of FIGURE 4 are assembled.
Figure 6:
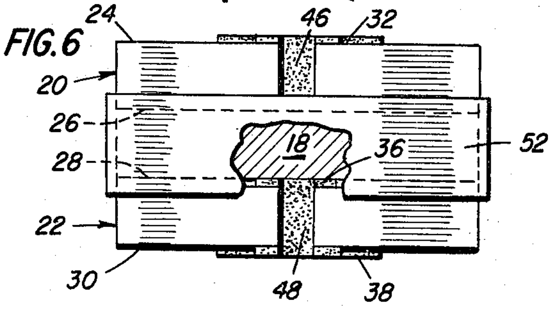
FIGURE 6 is a side elevation similar to FIGURE 5 showing the manner in which the elements of FIGURE 4 are permanently bonded together.

FIGURES 5 and 6 show the manner in which piezo-electric element 18 and contact and support members 20 and 22 are assembled. After preparation as described above, the three parts are juxtaposed and maintained under compression of at least 2–5 p.s.i., or preferably between about 10 and 50 p.s.i. (This is indicated by arrows 50 in FIGURE 5.)

As illustrated in FIGURE 6, contact and support members 20 and 22 and piezo-electric element 18 are permanently bonded together by means of a circumferential bonding strip 52 of somewhat greater thickness than the piezo-electric element 18. Strip 52 is formed of a quick setting epoxy resin applied in any convenient manner while piezo-electric element 18 and the support members 20 and 22 are clamped together under the required pressure. In addition to maintaining compressive forces on the piezo-electric element 18, bonding strip 52 serves the additional function of preventing contamination of the crystal surfaces during the subsequent manufacturing steps.

After the resin forming circumferential bonding strip 52 has set, electrical leads 14 and 16 are attached to the outer surfaces 24 and 30 of members 20 and 22. This is conveniently accomplished by soldering the leads 59 the central plated portions 32 and 38, e.g., at 54 on support member 22 (see FIGURE 2).

It has been found that in order to achieve the highest resistance to acceleration forces, inner surfaces 26 and 28 of contact and support members 20 and 22 are perferably made to conform almost exactly to the adjacent surfaces of piezo-electric element 18. Thus, even a slight concavity of support members 22 and 24 is found to degrade somewhat the performance of the crystal. On the other hand, it has been found that a slight non-conformance of the inner surfaces of the support members with the outer surfaces of the piezo-electric element results in a somewhat decreased electrical resistance for the crystal, whereby an oscillator having a higher quality factor (i.e., Q) may be produced. It has been found that substantial decreases in the electrical resistance over that with flat support members may be achieved without significantly degrading the structural integrity of the crystal. If desired, this may be accomplished in preparing support members 20 and 22 by introducing an extremely small degree of concavity into the surfaces. Such a situation is illustrated in FIGURES 5 and 6, but it should be understood that the curvature in the figures is greatly exaggerated. In fact, in the preferred form, the curvature of the surfaces, if present, is not visible to the unaided eye.

As pointed out above, remarkable improvement in resistance to damage by acceleration forces is achieved by the construction set forth above. However, it should be noted that the techniques are applicable only to AT and similar crystals, characterized by mechanical vibration in the shear mode. The techniques described do not appear to be applicable to crystals which vibrate in a flexural or extensional mode; the desired electrical performance of such crystals is not achieved when assembled as taught herein.

While the construction discussed above represents the preferred embodiment, it should be recognized that some modification is contemplated within the scope of the invention. For example, as mentioned above, radial slots 42 and 44 may be replaced by any other suitable means for providing electrical contact between leads 14 and 16 and an extended conducting surface in contact with a substantial area of the piezo-electric element itself. Moreover, if the slotted construction is used, the configuration thereof may be varied.

Support members 20 and 22 may be constructed of any suitable material, and in fact, may themselves be metallic as long as adequate electrical isolation between the support members is maintained.

Circumferential bonding strip 52 is preferably formed of a quick setting epoxy resin. However, any other material having satisfactory bonding properties may be substituted. In like fashion, the outer encapsulating shell 12 may be formed of epoxy or any other material having appropriate properties.

Thus, the present embodiments are therefore to be considered in all respects as illustrative and not restrictive, the scope of the invention being indicated by the appended claims rather than by the foregoing description, and all changes which come within the meaning and range of equivalency of the claim are therefore intended to be embraced therein.

What is claimed and desired to be secured by United States Letters Patent is:

1. An improved piezo-electric transducer capable of withstanding shock and vibration comprising: a piezo-electric element responsive to mechanical vibration in the shear mode, said element having first and second opposed substantially flat surfaces; first and second support members located adjacent said first and second surfaces and covering a major portion of each of said surfaces, each of said support members comprising a thin wafer-like slab having a slotted portion extending inwardly from the periphery of the slab toward the center; means for establishing electrical contact between each support member and the adjacent surface of the piezo-electric element, said electrical contact comprising first and second conductive plating on each of said slab surfaces and on the walls of the slotted portions; bonding means for bonding said piezo-electric element and said support members together to maintain substantially uniform compressive forces of 10 to 50 p.s.i. to the surfaces of said piezo-electric element, said bonding means comprising a resinous peripheral band extending around the crystal and covering the entire edge of the piezo-electric crystal and at least a portion of the edges of the support members; an outer casing comprising molded epoxy resin completely surrounding said piezo-electric element, said first and second support members and said bonding means; and first and second wires extending outwardly from said casing and in electrical contact with said first and second surfaces of the piezo-electric element.

References Cited

UNITED STATES PATENTS

| | | | |
|---|---|---|---|
| 2,486,482 | 11/1949 | La Brie | 310—9.2 |
| 2,509,478 | 5/1950 | Caroselli | 310—9.2 |
| 2,829,284 | 6/1958 | Gerber | 310—9.7 |
| 2,891,177 | 6/1959 | Hafner | 310—9.1 |
| 2,814,741 | 11/1957 | Minich | 310—9.1 |
| 2,963,597 | 12/1960 | Gerber | 310—9.7 |
| 3,230,402 | 1/1966 | Nightingale | 310—8.3 |
| 3,339,090 | 8/1967 | Jaffe | 310—8.1 |
| 3,339,091 | 8/1967 | Hammond | 310—9.1 |
| 3,359,435 | 12/1967 | Webb | 310—9.1 |
| 3,360,665 | 12/1967 | Boswell | 310—8.7 |

J D MILLER, Primary Examiner

U.S. Cl. X.R.

310—8.5, 9.2